United States Patent
Zak et al.

(10) Patent No.: US 7,483,692 B2
(45) Date of Patent: Jan. 27, 2009

(54) SYSTEM AND METHOD OF PREDICTING USER INPUT TO A MOBILE TERMINAL

(75) Inventors: Robert A. Zak, Cary, NC (US); Peter M. Mangum, Raleigh, NC (US); Michael Shannon Welch, Raleigh, NC (US); Paul Henry Nichols, Raleigh, NC (US); Myra Rice, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 186 days.

(21) Appl. No.: 10/905,909

(22) Filed: Jan. 26, 2005

(65) Prior Publication Data
US 2006/0141990 A1 Jun. 29, 2006

Related U.S. Application Data

(60) Provisional application No. 60/593,246, filed on Dec. 28, 2004.

(51) Int. Cl.
*H04Q 7/32* (2006.01)
(52) U.S. Cl. .................. 455/412.1; 455/550.1
(58) Field of Classification Search ............ 455/405, 455/408, 410, 411, 412.1, 412.2, 414.1, 550.1
See application file for complete search history.

(56) References Cited

U.S. PATENT DOCUMENTS

| | | | |
|---|---|---|---|
| 5,797,098 A | 8/1998 | Schroeder et al. | |
| 5,841,949 A | 11/1998 | Nakaya et al. | |
| 5,940,751 A * | 8/1999 | Kaplan et al. | 455/411 |
| 6,738,514 B1 | 5/2004 | Shin et al. | |
| 6,801,659 B1 | 10/2004 | O'Dell | |
| 2003/0181219 A1* | 9/2003 | Huang | 455/558 |
| 2005/0185773 A1* | 8/2005 | Burger et al. | 379/88.22 |
| 2005/0221805 A1* | 10/2005 | Koyano | 455/414.2 |
| 2006/0014518 A1* | 1/2006 | Huh et al. | 455/406 |

OTHER PUBLICATIONS

Matthias Hellmund, "Smart Personalization for Wireless Applications", Thesis submitted for Media and Computer Science, Dept. of Digital Media, University of Applied Sciences, Furtwangen, Bermany (2003).

(Continued)

*Primary Examiner*—Sam Bhattacharya
(74) *Attorney, Agent, or Firm*—Frederick D. Bailey; Moore & Van Allen, PLLC

(57) ABSTRACT

A method of predicting user input to a mobile terminal is presented. The mobile terminal creates a raw user input data record comprised of input to the mobile terminal. A contextual data record is appended to the raw user input data record and both are stored. Another process processes the records contained in the raw user input database to identify repetitive patterns of user input. Identified patterns are stored in a recognized input pattern database. The mobile terminal then monitors current input and compares it to the repetitive patterns stored in the recognized input pattern database. Upon matching the current input to a repetitive pattern within a specified tolerance, the mobile terminal prompts the user to allow the mobile terminal to complete the process of inputting the data.

15 Claims, 2 Drawing Sheets

OTHER PUBLICATIONS

ZI Corporation, Web news articles, http://www.zicorp.com/zitechnology.htm, Nov. 2004.

Sony Ericsson Mobile Communications AB, International Application No. PCT/US05/21714, Written Opinion, Dec. 27, 2006.

Sony Ericsson Mobile Communications AB, International Application No. PCT/US05/21714, "International Preliminary Report on Patentability", Mar. 15, 2007.

* cited by examiner

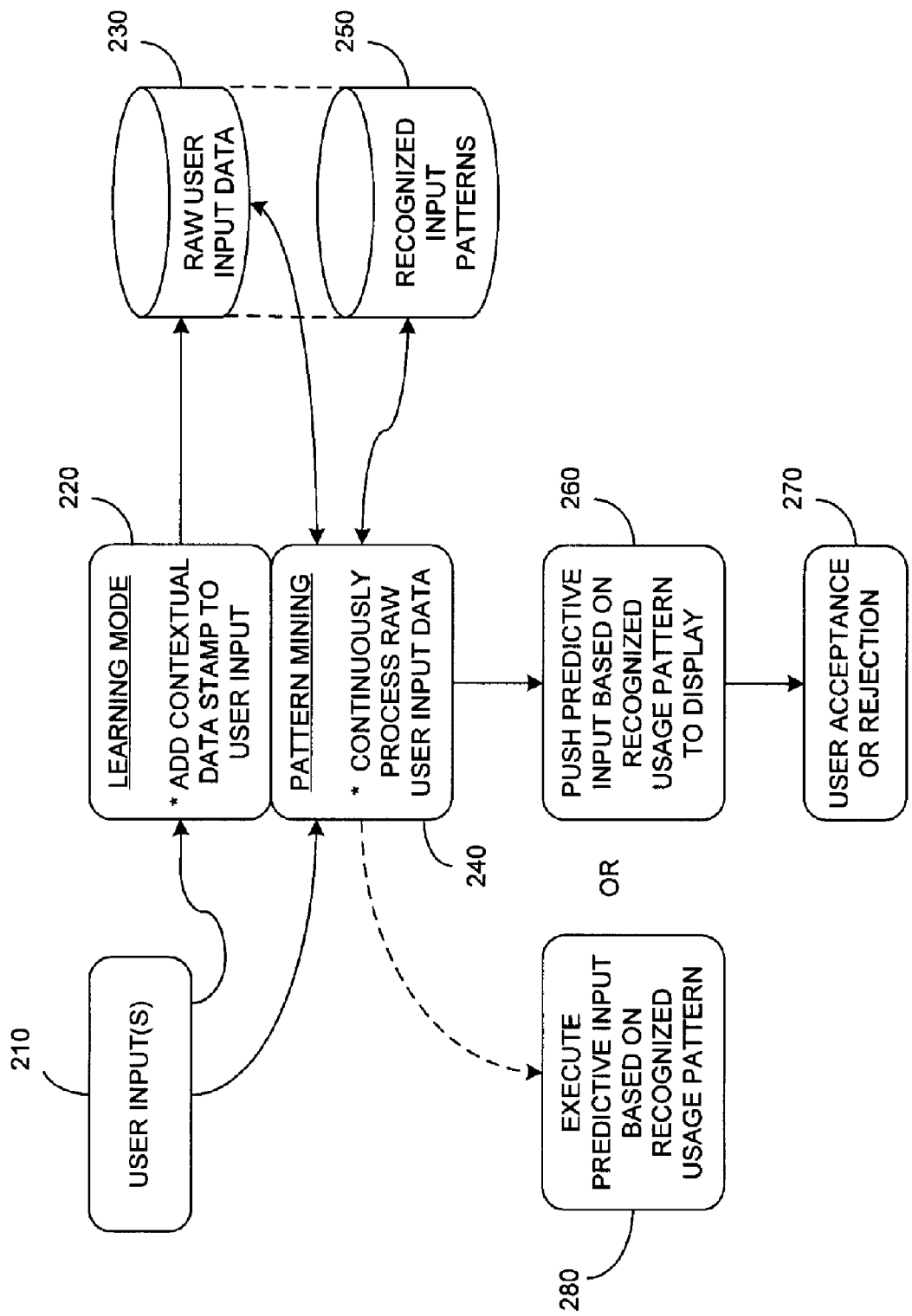

SYSTEM AND METHOD OF PREDICTING USER INPUT TO A MOBILE TERMINAL

BACKGROUND

Mobile phones or terminals are evolving into very robust voice and data devices that can provide an ever expanding variety of services for a user. Mobile terminal users often repeat the same or similar activities out of habit. Unfortunately, the user is required to input the same data each time to achieve the same result. This can be tedious to the user because many of the input mechanisms associated with the mobile terminal are small due to the portable nature of the mobile terminal. It can be frustrating to access a relatively small keypad while monitoring a relatively small display.

What is needed is a means by which a mobile terminal can learn and anticipate much of a user's activities on the mobile terminal that result from a recognized pattern of input data.

SUMMARY

The present invention includes a method, system and computer program product for predicting user input to a mobile terminal is presented. The mobile terminal creates a raw user input data record comprised of input to the mobile terminal. A contextual data record is appended to the raw user input data record and both are stored. Another process processes the records contained in the raw user input database to identify repetitive patterns of user input. Identified patterns are stored in a recognized input pattern database. The mobile terminal then monitors current input and compares it to the repetitive patterns stored in the recognized input pattern database. Upon matching the current input to a repetitive pattern within a specified tolerance, the mobile terminal prompts the user to allow the mobile terminal to complete the process of inputting the data. Alternatively, if the mobile terminal has a high degree of confidence it can automatically complete the process of inputting the data without prompting the user.

The present invention can also provide an alert to the user prior to prompting the user to allow the mobile terminal to complete the process of inputting the data.

To prevent the databases from becoming unwieldy or going beyond their capacity, the mobile terminal can purge the raw user input database and the recognized input pattern database of data within that has aged beyond a specified date.

BRIEF DESCRIPTION OF THE DRAWINGS

FIG. 2 is a flowchart illustrating the present invention.

DETAILED DESCRIPTION

Figure 1:
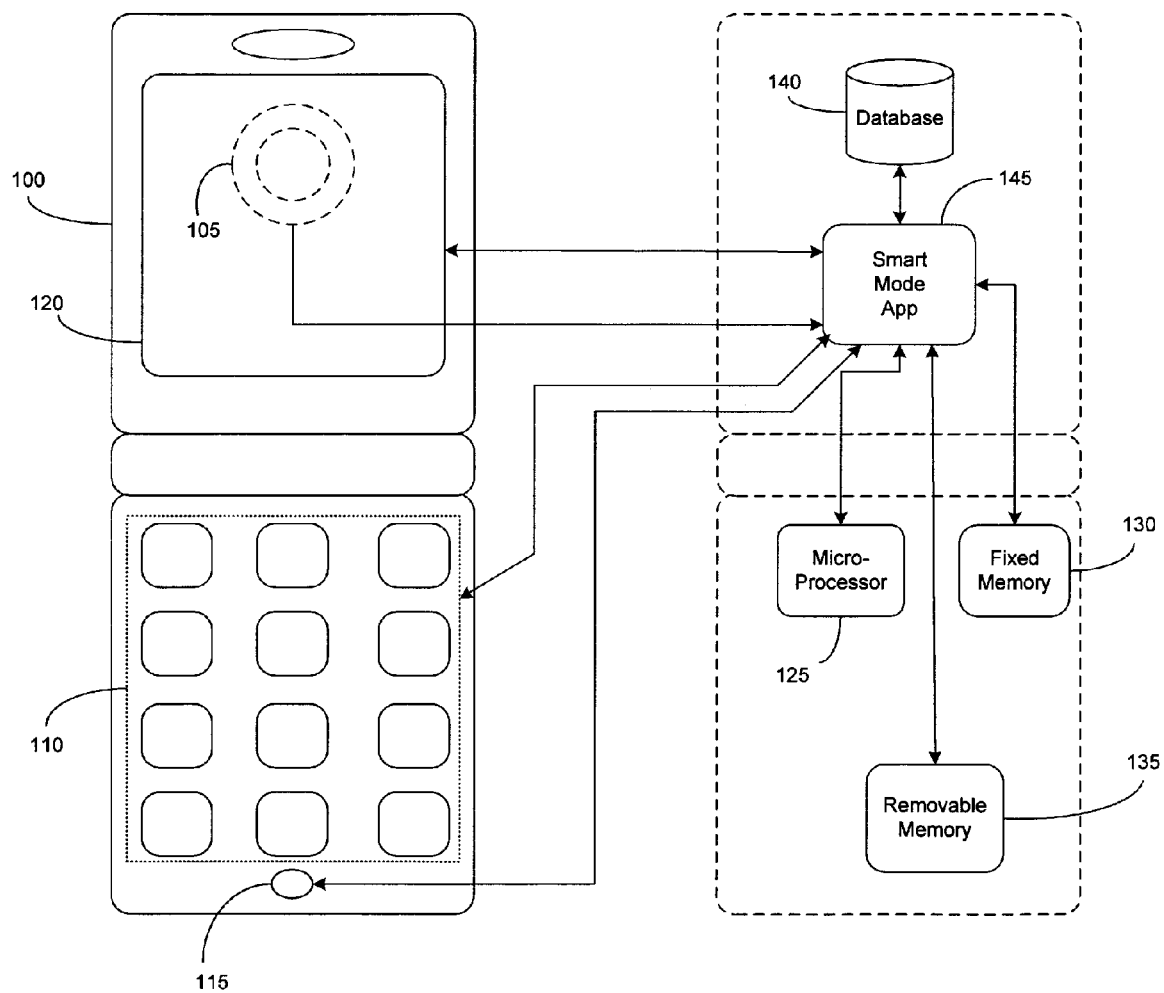
FIG. 1 is a block diagram illustrating the environment in which the present invention operates.

The term mobile terminal as used herein includes mobile cellular phones or handsets as well as other portable wireless communication devices that can access a cellular network.

FIG. 1 illustrates a portable wireless communication device in the form of a mobile terminal (cellular phone) 100 showing the hardware and software components relative to the present invention. The present invention takes the form of a software application that coordinates, controls, and processes user input in an effort to record and discover repetitive input patterns by the user. The repetitive input patterns can relate to any number of functional aspects of the mobile terminal including, but not limited to, voice communications (phone dialing, phone settings, data communications (SMS or MMS messaging, e-mail, Internet access and browsing, connectivity—IR or Bluetooth or serial cable), phone management (profile settings such as volume, background displays, themes, camera activities, file management), and application management (phonebook, contacts, calendar, tasks) among others.

The basic premise calls for a continuously running background application to monitor and store user input and contemporaneous contextual data associated with the user input. This background application dubbed the "smart mode application" also mines the raw user input data in search of repetitive patterns. When the user begins a new input sequence the smart mode application may recognize the input as one previously used and offer to "finish" the input for the user. This would save the user time and effort in manually entering input data.

The mobile terminal 100 can include several modes of input such as a camera 105 (still or video), a keypad 110, a microphone 115, and a touchscreen display 120. Camera input could include gesture recognition. Microphone input could include voice commands, Keypad input includes one or more keypresses. Touchscreen input includes responses contact with specific areas on the display. The smart mode application 145 executing in the background with the aid of a microprocessor 125 monitors the user input from these modes of input and stores the raw input data in a databases 40. The smart mode application 145 also has access to other mobile terminal components including, but not limited to, fixed memory 130, and one or more removable memory devices 135 such as a SIM card, compact flash, memory stick or the like.

FIG. 2 illustrates steps used to predict a user's input intent to a mobile terminal. The smart mode application can be functionally divided into two modes. The first mode is a learning mode. The second mode is a pattern mining mode.

In the learning mode the smart mode application logs 220 all user input 210 to the mobile terminal into a raw user input database 230. In addition to the actual input, the learning mode component adds contextual data to the user input record. The contextual data can include, but is not limited to, time and date stamps, geographic location data, network call or data activity, and current mobile terminal profile settings. The contextual data provides allows the pattern mining mode 240 to discover user input patterns that may be temporally and/or spatially related as well as just content related. For instance, a user may dial the same number on or about the same time every day. Or, the user may check his calendar every morning at approximately the same time. The contextual data allows the pattern mining mode to discover that the input content occurs on a regularly scheduled interval.

The pattern mining mode 240 also runs in the background. It continuously processes the ever expanding raw user input database for input patterns. It performs its analysis using the actual content data and the contextual data to seek out repetitive input patterns. The pattern mining mode also monitors current user input so that it can compare the current input as it occurs to a database of recognized input patterns 250. When a threshold that indicates a match is likely occurs the smart mode application can take action.

The most likely action is for the smart mode application to push the remainder of the anticipated user input to the display and prompt the user if this is his intent 260. The prompt may be preceded by an audible (tone), physical (vibration), or visual (flashing icon or the like) alert to the user that a pattern may have been recognized. If so, the user can indicate his acceptance or rejection of the prompt accordingly 270. If the user accepts the prompt the smart mode application will automatically perform the desired function or activity that the sequence of inputs would have accomplished. If the user rejects the prompt he is free to continue manual input into the mobile terminal.

If the smart mode application detects a pattern with a very high confidence that this is the user's intent, the smart mode application can bypass the user prompt step and automatically initiate the activity 280. For example, a user may desire his daily calendar to automatically display on his device every morning at 7:30 am. When the device's clock indicates 7:30 am, the calendar will automatically display. If the user initiates input for the calendar prior to but close to 7:30, the smart mode application is confident that this is his intent and can automatically perform the task.

Sometimes the user input may be indicative of a partial task such as composing a message to be sent. The smart mode may recognize that the user wants to compose a message but not yet know the intended recipient(s). In this case the smart mode application can perform as much of the task as possible based on the recognized pattern of user input. The message screen will be presented to the user for him to enter recipient data and message content or attachment data. The smart mode can continue to monitor the content input and may recognize a new pattern. In such a case the user may not have to input all of the recipient or content data if the smart mode application can recognize it as it is being input. Thus, the predictive input aspect of the present invention can be incremental in nature meaning that sub-tasks or sub-activities that comprise the overall task or activity can be independently recognized and acted upon.

An advantage of the present invention is that it can reduce the need for a mobile terminal user to repeat the same or similar inputs to accomplish a specific task.

The smart mode application can be disabled by the user if desired. In addition, the raw user input database 230 can be purged if it grows too large. This can be done on a time basis by purging all records six months old or more once the database size limit has been reached. The exact time threshold can be altered to suit the user. Similarly, the recognized input pattern database 250 can be purged if it grows too large.

It should be noted that computer program code in the form of various computer program instructions can be used to implement at least portions of the processes involved in carrying out embodiments of the invention. Such computer program code can be supplied via a computer program product containing all or a portion of the computer program instructions stored on a media. The media may be fixed, or removable. Such a media could be a fixed storage media, but it could just as easily be a removable optical or magnetic disc or tape. The computer program instructions can reside on any medium that can contain, store, communicate, propagate, or transport computer program code for execution by any type of computing platform, instruction execution system, or collection of such systems interconnected via a buss or network. Such a computer readable medium may be, for example, but not limited to, an electronic, magnetic, optical, electromagnetic, infrared, or semiconductor system or device.

Computer program instructions which implement all or a portion of the invention may also be embodied in a stream of information being retrieved over a network such as the Internet. Note that the computer usable or computer readable medium could even be paper or another suitable medium upon which computer program code is printed, as the code can be electronically captured via, for instance, an optical scan, then compiled and interpreted, or otherwise processed in a suitable manner.

Although the present invention has been shown and described in considerable detail with respect to an exemplary embodiment of the invention, it should be understood by those skilled in the art that it is not intended to limit the invention to specific embodiments disclosed. Various modifications, omissions, and additions may be made to the disclosed embodiments without materially departing from the novel teachings and advantages of the invention, particularly in light of the foregoing teachings.

What is claimed is:

1. A method of predicting user input to a mobile terminal comprising:
    creating a raw user input data record comprised of input to the mobile terminal
    creating a contextual data record to be appended to the raw user input data record;
    storing the combined raw user input data record and contextual data record in a raw user input database;
    processing the records contained in the raw user input database to identify repetitive patterns of user input;
    storing repetitive patterns of user input in a recognized input pattern database;
    monitoring current input to the mobile terminal;
    comparing the current user input to the repetitive patterns stored in the recognized input pattern database; and
    upon matching the current input to a repetitive pattern in the database within a specified tolerance, prompting the user to allow the mobile terminal to complete the process of inputting the data.

2. The method of claim 1 further comprising providing an alert to the user prior to prompting the user to allow the mobile terminal to complete the process of inputting the data.

3. The method of claim 1 further comprising purging the raw user input database of data within that has aged beyond a specified date.

4. The method of claim 1 further comprising purging the recognized input pattern database of data within that has aged beyond a specified date.

5. A method of predicting user input to a mobile terminal comprising:
    creating a raw user input data record comprised of input to the mobile terminal
    creating a contextual data record to be appended to the raw user input data record;
    storing the combined raw user input data record and contextual data record in a raw user input database;
    processing the records contained in the raw user input database to identify repetitive patterns of user input;
    storing repetitive patterns of user input in a recognized input pattern database;
    monitoring current input to the mobile terminal;
    comparing the current user input to the repetitive patterns stored in the recognized input pattern database; and
    upon matching the current input to a repetitive pattern in the database within a specified tolerance, automatically completing the process of inputting the data.

6. The method of claim 5 further comprising purging the raw user input database of data within that has aged beyond a specified date.

7. The method of claim 5 further comprising purging the recognized input pattern database of data within that has aged beyond a specified date.

8. A computer program product for predicting user input to a mobile terminal, the computer program product comprising:
    computer program code for creating a raw user input data record comprised of input to the mobile terminal;

computer program code for creating a contextual data record to be appended to the raw user input data record;

computer program code for storing the combined raw user input data record and contextual data record in a raw user input database;

computer program code for processing the records contained in the raw user input database to identify repetitive patterns of user input;

computer program code for storing repetitive patterns of user input in a recognized input pattern database;

computer program code for monitoring current input to the mobile terminal;

computer program code for comparing the current user input to the repetitive patterns stored in the recognized input pattern database; and upon matching the current input to a repetitive pattern in the database within a specified tolerance, computer program code for prompting the user to allow the mobile terminal to complete the process of inputting the data.

9. The computer program product of claim 8 further comprising computer program code for providing an alert to the user prior to prompting the user to allow the mobile terminal to complete the process of inputting the data.

10. The computer program product of claim 8 further comprising computer program code for purging the raw user input database of data within that has aged beyond a specified date.

11. The computer program product of claim 8 further comprising computer program code for purging the recognized input pattern database of data within that has aged beyond a specified date.

12. A computer program product for predicting user input to a mobile terminal, the computer program product comprising:

computer program code for creating a raw user input data record comprised of input to the mobile terminal;

computer program code for creating a contextual data record to be appended to the raw user input data record;

computer program code for storing the combined raw user input data record and contextual data record in a raw user input database;

computer program code for processing the records contained in the raw user input database to identify repetitive patterns of user input;

computer program code for storing repetitive patterns of user input in a recognized input pattern database;

computer program code for monitoring current input to the mobile terminal;

computer program code for comparing the current user input to the repetitive patterns stored in the recognized input pattern database; and upon matching the current input to a repetitive pattern in the database within a specified tolerance, computer program code for automatically completing the process of inputting the data.

13. The computer program product of claim 12 further comprising computer program code for purging the raw user input database of data within that has aged beyond a specified date.

14. The computer program product of claim 12 further comprising computer program code for purging the recognized input pattern database of data within that has aged beyond a specified date.

15. A system for predicting user input to a mobile terminal comprising:

means for creating a raw user input data record comprised of input to the mobile terminal;

means for creating a contextual data record to be appended to the raw user input data record;

means for storing the combined raw user input data record and contextual data record in a raw user input database;

means for processing the records contained in the raw user input database to identify repetitive patterns of user input;

means for storing repetitive patterns of user input in a recognized input pattern database;

means for monitoring current input to the mobile terminal;

means for comparing the current user input to the repetitive patterns stored in the recognized input pattern database; and upon matching the current input to a repetitive pattern in the database within a specified tolerance, means for prompting the user to allow the mobile terminal to complete the process of inputting the data.

* * * * *